United States Patent
Lin et al.

(10) Patent No.: US 9,131,160 B2
(45) Date of Patent: Sep. 8, 2015

(54) METHOD FOR CONTROLLING EXPOSURE TIME OF HIGH DYNAMIC RANGE IMAGE

(71) Applicant: Quanta Computer Inc., Tao Yuan Shien (TW)

(72) Inventors: Keng-Sheng Lin, New Taipei (TW); Chih-Chi Cheng, New Taipei (TW); Chung-Te Li, New Taipei (TW); Hsin-Yu Chen, Tainan (TW); Wen-Chu Yang, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 56 days.

(21) Appl. No.: 14/073,067

(22) Filed: Nov. 6, 2013

(65) Prior Publication Data

US 2015/0042836 A1 Feb. 12, 2015

(30) Foreign Application Priority Data

Aug. 8, 2013 (TW) .............................. 102128455 A (51) Int. Cl.
 *H04N 5/235* (2006.01)
 *H04N 5/355* (2011.01)

(52) U.S. Cl.
 CPC ........... *H04N 5/2353* (2013.01); *H04N 5/2356* (2013.01); *H04N 5/355* (2013.01); *H04N 5/35536* (2013.01); *H04N 5/2355* (2013.01)

(58) Field of Classification Search
 CPC .. H04N 5/235; H04N 5/2351; H04N 5/35536
 See application file for complete search history.

(56) References Cited

U.S. PATENT DOCUMENTS

| | | | | |
|---|---|---|---|---|
| 8,184,173 | B1* | 5/2012 | Koifman et al. | 348/222.1 |
| 2002/0176010 | A1* | 11/2002 | Wallach et al. | 348/229.1 |
| 2005/0275747 | A1* | 12/2005 | Nayar et al. | 348/362 |
| 2006/0133688 | A1* | 6/2006 | Kang et al. | 382/254 |
| 2006/0140510 | A1* | 6/2006 | Wallace et al. | 382/294 |
| 2006/0158523 | A1* | 7/2006 | Estevez et al. | 348/208.4 |
| 2008/0094486 | A1* | 4/2008 | Fuh et al. | 348/229.1 |
| 2009/0251591 | A1* | 10/2009 | Whitham | 348/362 |
| 2009/0303347 | A1* | 12/2009 | Kwon et al. | 348/229.1 |
| 2010/0033497 | A1* | 2/2010 | Ueno et al. | 345/611 |
| 2010/0259636 | A1* | 10/2010 | Tzur et al. | 348/222.1 |

(Continued)

OTHER PUBLICATIONS

Paul E. Debevec and Jitendra Malik, "Recovering High Dynamic Range Radiance Maps from Photographs" In SIGGRAPH 97, Aug. 1997.

*Primary Examiner* — Nicholas Giles
*Assistant Examiner* — Abdelaaziz Tissire
(74) *Attorney, Agent, or Firm* — McClure, Qualey & Rodack, LLP (57) ABSTRACT

A method for controlling an exposure duration of a high dynamic range image, including: consecutively generating a first high dynamic range image having a first exposure duration ratio and a second high dynamic range image having a second exposure duration ratio greater than the first exposure duration ratio; performing image quality evaluations on both the first high dynamic range image and the second high dynamic range image to obtain a first image quality and a second image quality, respectively; and determining whether the second image quality is better than the first image quality; if yes, generating a third high dynamic range image having a third exposure duration ratio greater than the second exposure duration ratio; if not, generating the third high dynamic range image having the first exposure duration ratio and setting the first exposure duration ration as the optimal exposure duration ratio.

8 Claims, 4 Drawing Sheets

(56) References Cited

U.S. PATENT DOCUMENTS

| | | | |
|---|---|---|---|
| 2011/0090365 A1* | 4/2011 | Cha et al. | 348/229.1 |
| 2011/0096085 A1* | 4/2011 | Cha et al. | 345/589 |
| 2012/0257077 A1* | 10/2012 | Suzuki | 348/222.1 |
| 2013/0208138 A1* | 8/2013 | Li et al. | 348/229.1 |
| 2013/0208139 A1* | 8/2013 | Lin et al. | 348/229.1 |
| 2013/0235232 A1* | 9/2013 | Yang et al. | 348/229.1 |
| 2014/0168468 A1* | 6/2014 | Levoy et al. | 348/229.1 |
| 2015/0029354 A1* | 1/2015 | Yang et al. | 348/222.1 |

* cited by examiner

METHOD FOR CONTROLLING EXPOSURE TIME OF HIGH DYNAMIC RANGE IMAGE

CROSS-REFERENCE TO RELATED APPLICATION

This application claims priority from Taiwan Patent Application No. 102128455, filed on Aug. 8, 2013 in Taiwan Intellectual Property Office, the contents of which are hereby incorporated by reference in their entirety.

BACKGROUND OF THE INVENTION

1. Field of the Invention

The present invention is related to a method for controlling exposure time of high dynamic range images, and particularly related to a method of using an image sensor to capture images of different exposure durations, merging images of different exposure durations to form a high dynamic range image, and adjusting an exposure duration ratio to obtain a high dynamic range image of best quality.

2. Description of the Related Art

The dynamic range of a contemporary consumer digital camera or webcam, which is the ratio between the greatest to the smallest brightness values, is around 400, and the dynamic ranges of more professional single-eye cameras can be increased up to 1000. However, most of the dynamic ranges of indoor scenes exceed 1500, while the dynamic ranges of outdoor scenes usually reaches up to $10^5$. Therefore, the present equipments can merely capture partial brightness information of scene.

To solve the aforementioned problem, P. E. Debevec proposed the technology of the high dynamic range image to merge a plurality of images of different exposure durations in 1997 in "Paul E. Debevec, Jitendra Malik, *Recovering High Dynamic Range Radiance Maps from Photographs*, SIGGRAPH 1997", namely combining a plurality of images having different exposure durations. Higher dynamic range information can be obtained by increasing the exposure duration ratio of two original images. However, it is also necessary to compress more dynamic range information into the displayable dynamic range of a screen, and this process is called color mapping or tone mapping. Since the dynamic range of a screen is very low and about 200, the compression process of color mapping will destroy details and contrast of an image and cause the overall image quality to downgrade. In other words, best image quality cannot be obtained by simply increasing the exposure duration ratio. Besides, most high dynamic range image systems in the market are outfitted with a fixed exposure duration ratio, or require a user to manually set up the exposure duration ratio.

SUMMARY OF THE INVENTION

The present invention discloses a method for controlling exposure time of high dynamic range images, and provides a set of techniques for evaluating image quality to automatically determine an optimal exposure duration ratio. When a light source of a scene is altered somewhat, the optimal exposure duration ratio can be automatically re-determined to maintain the best image quality.

The method for controlling exposure time of high dynamic range images includes steps of: using an image sensor to consecutively generate a first high dynamic range image having a first exposure duration ratio and a second high dynamic range image having a second exposure duration ratio, and the second exposure duration ratio being greater than the first exposure duration ratio; performing an image quality evaluation for the first high dynamic range image to obtain a first image quality, and performing an image quality evaluation for the second high dynamic range image to obtain a second image quality; judging whether the second image quality is superior to the first image quality; using a third exposure duration ratio greater than the second exposure duration ratio to shoot a third high dynamic range image if the second image quality is superior to the first image quality; and using the first exposure duration ratio to shoot the third high dynamic range image if the second image quality is not superior to the first image quality, and setting the first exposure duration ratio as an optimal exposure duration ratio.

In summation of the above, an image sensor is utilized in the method for controlling exposure time of high dynamic range images of the present invention to consecutively generate a plurality of high dynamic range images in the image generation process and perform image quality evaluations for the high dynamic range images. The search for the optimal exposure duration ratio begins with the lowest exposure duration ratio, the exposure duration ratio is step by step increased till the image quality begins to deteriorate, and then the previous exposure duration ratio may be decided as the optimal exposure duration ratio. When the optimal exposure duration ratio is obtained, the method for an image quality evaluation is applied to verify if the image quality of the present image is the same as the image quality of the previous image. If both image qualities are the same, the optimal exposure ratio will be preserved; if the image quality deteriorates due to variation of the light source, the original lowest exposure duration ratio will be reset as the exposure duration ratio and the search for the optimal exposure duration ratio is repeated.

DETAILED DESCRIPTION OF THE PREFERRED EMBODIMENTS

To illustrate the characteristics, content, and advantages of the present invention and the effects it can fulfill, a preferred embodiment and the corresponding drawings are provided to offer more detailed descriptions. The purpose of the drawings being used is for illustration and to assist the specifications, they are not necessarily the real proportion and precise allocations of the embodiments of the present invention. Thus, they should not be used to limit the privilege coverage of the practical embodiments of the present invention.

Figure 1:
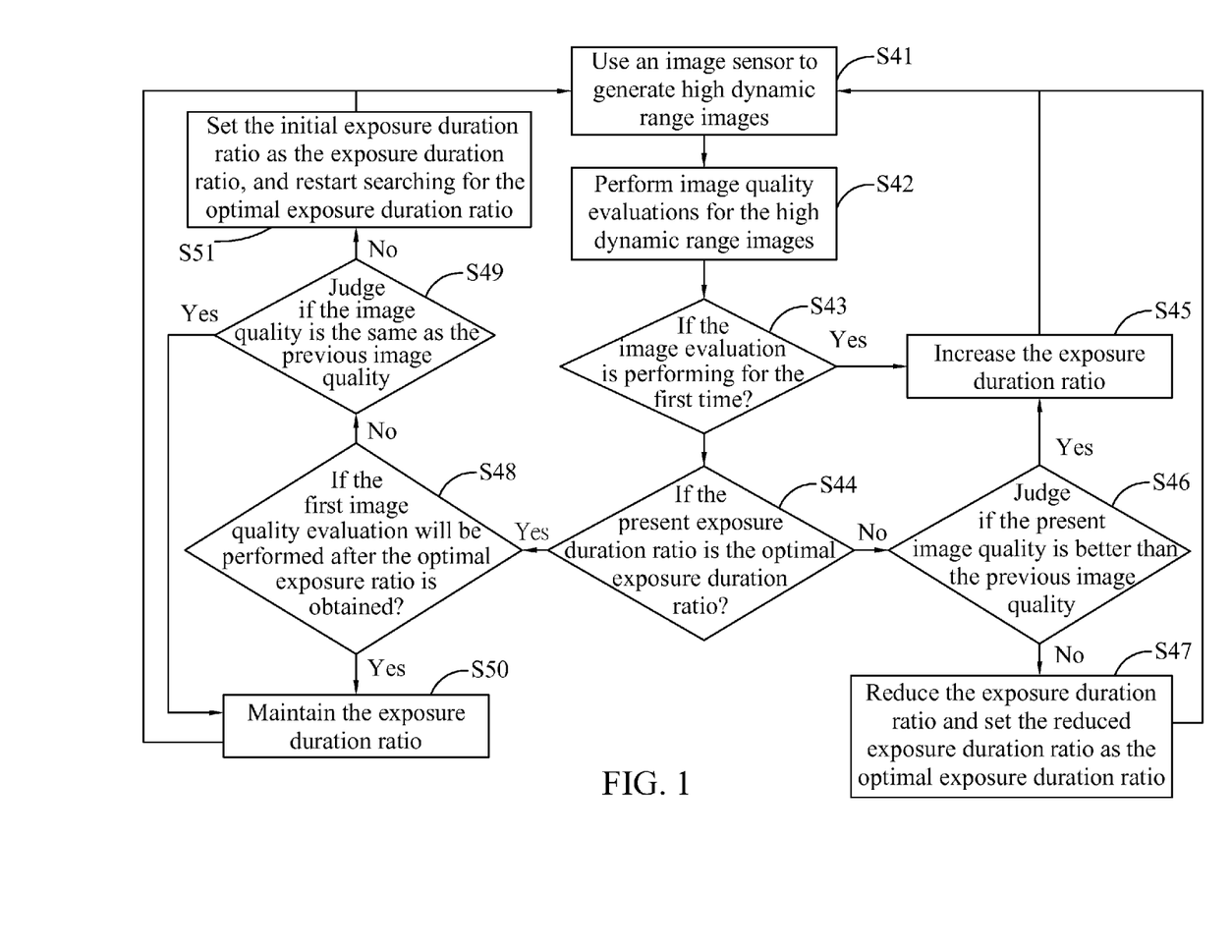
FIG. 1 is a flow diagram showing the method for controlling exposure time of high dynamic range images according to a preferred embodiment of the present invention.

FIG. 1 is a flow diagram showing the method for controlling exposure time of high dynamic range images according to a preferred embodiment of the present invention. The flow of FIG. 1 includes steps of:

S41: Use an image sensor to generate high dynamic range images.

S42: Perform image quality evaluations for the high dynamic range images.

S43: If the image evaluation is performed for the first time? If yes, then enter Step S45: if not, then enter Step S44.

S44: If the present exposure duration ratio is the optimal exposure duration ratio? If yes, then enter Step S48; if not, then enter Step S46.

S45: Increase the exposure duration ratio.

S46: Judge if the present image quality is better than the previous image quality. If yes, then enter Step S45; if not, enter Step S47.

S47: Reduce the exposure duration ratio and set the reduced exposure duration ratio as the optimal exposure duration ratio.

S48: If the first image quality evaluation will be performed after the optimal exposure ratio is obtained? If yes, enter Step S50; if not, enter Step S49.

S49: Judge if the image quality is the same as the previous image quality substantially. If yes, enter Step S50; if not, enter Step S51.

S50: Maintain the exposure duration ratio.

S51: Set the initial exposure duration ratio as the exposure duration ratio, and restart searching for the optimal exposure duration ratio.

Figure 2:
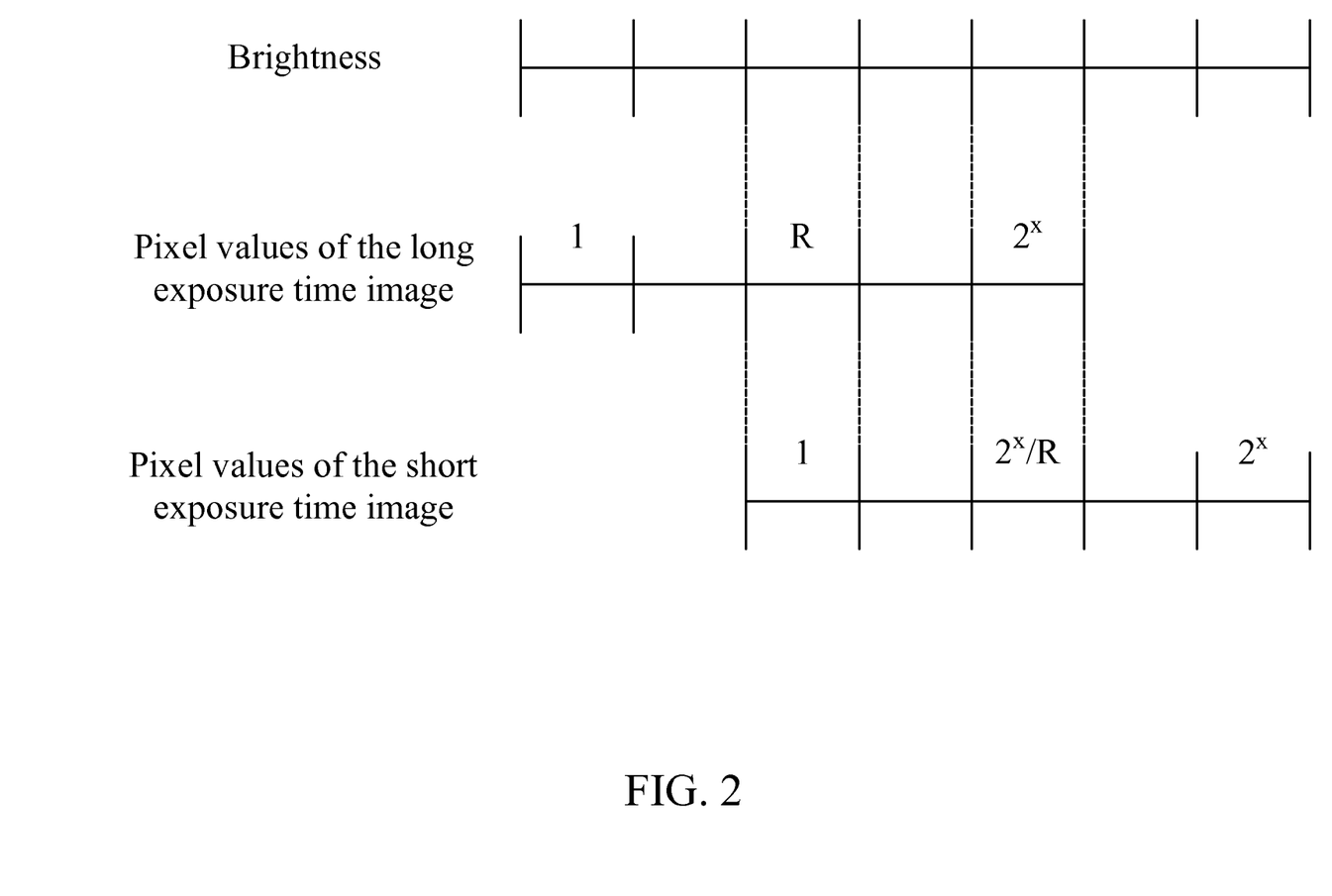
FIG. 2 is a diagram showing the pixel values of a long exposure time image and a short exposure time image versus brightness according to the preferred embodiment of the method for controlling exposure time of high dynamic range images of the present invention.

Referring to FIG. 2 for Step S41. FIG. 2 is a diagram showing the pixel values of a long exposure time image and a short exposure time image versus brightness according to the preferred embodiment of the method for controlling exposure time of high dynamic range images of the present invention. A light source of certain brightness in an environment will generate different pixel values under different exposure time. Suppose R represents an exposure duration ratio between a long exposure time image to a short exposure time image, the pixel values of the two images derived under the same light source and different exposure durations will have a difference of R times. Therefore, two images having different exposure durations can be merged together by merely multiplying the pixel value of each pixel in the short exposure time image by R. Similarly, two images having different exposure durations can be merged together by merely dividing the pixel value of each pixel in the long exposure time image by R.

In a practical embodiment, the exposure duration ratio R may be decided by a user or by a system default. When the exposure duration ratio R is decided, an exposure time A can be decided by using an auto exposure mechanism of an ordinary camera, and the exposure duration of the long exposure time image and the exposure duration of the short exposure time image can be increased or decreased with reference to A, i.e., an average of the exposure durations of the long exposure time image and the short exposure time image is equal to A. For example, if the exposure duration ratio R is 3 and the exposure duration of the long exposure time image is 1.5A, the exposure duration of the short exposure time image will be 0.5A. If the exposure duration ratio R is 7 and the exposure duration of the long exposure time image is 1.75 A, then the exposure duration of the short exposure time image will be 0.25A.

In a practical embodiment, the user may shut down the auto-exposure function of the ordinary camera and decide an exposure value B by manual setup. Afterward, the exposure durations of the long exposure time image and the short exposure time image can be increased or decreased asymmetrically according to exposure value B to search for the optimal exposure duration ratio. For example, the exposure durations of the long exposure time image and the short exposure time image may be 1.25B and 0.125B, respectively, when the exposure duration ratio R is 10. The advantage of manual setup of the exposure value is to obtain the high dynamic range images having the best quality.

Figure 3:
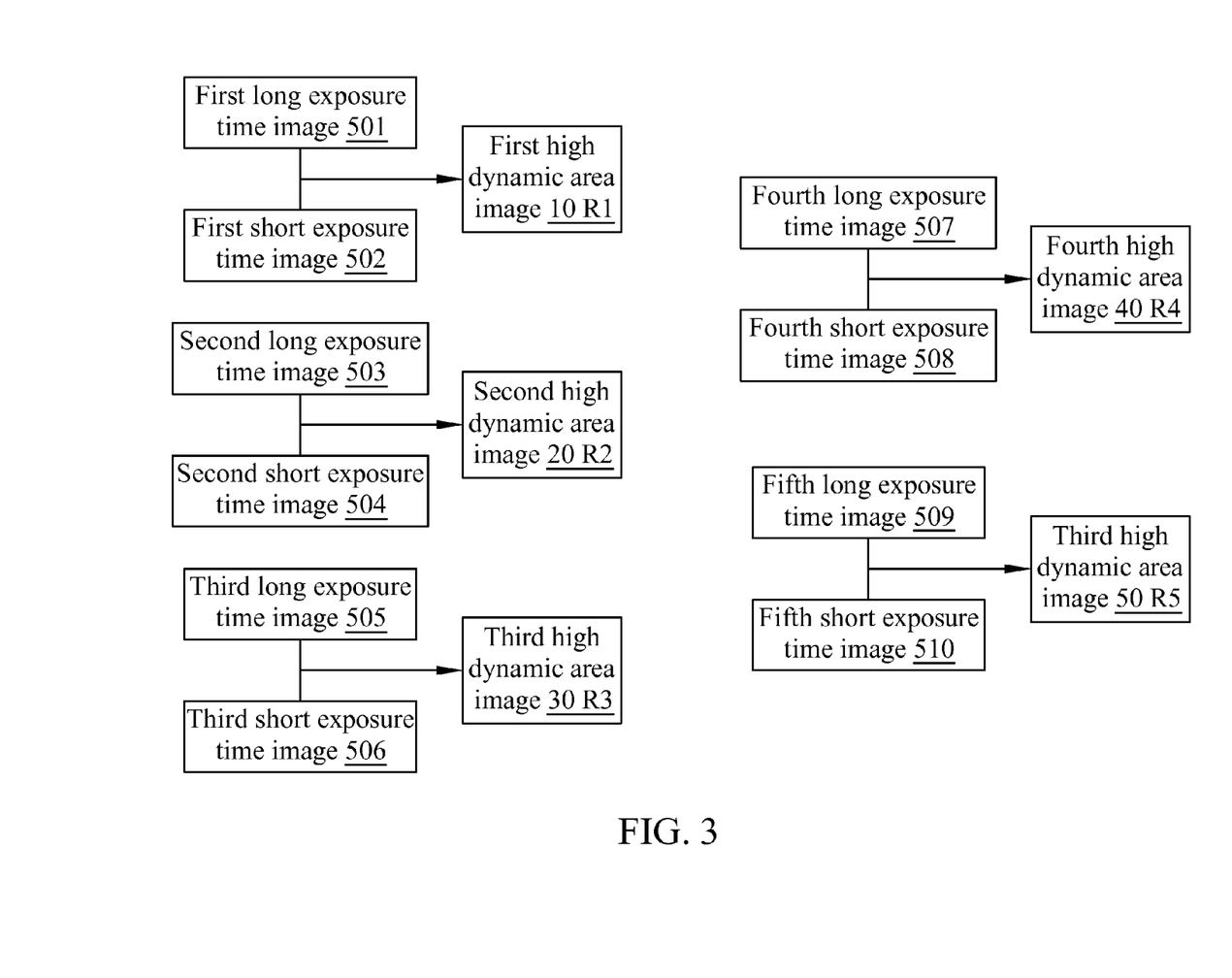
FIG. 3 is a diagram showing generation of the high dynamic range image according to the preferred embodiment of the method for controlling exposure time of high dynamic range images of the present invention.

Referring to FIG. 3. It is assumed that in Step S41 an initial exposure duration ratio R1 is utilized by the image sensor to shoot a first long exposure time image 501 and a first short exposure time image 502. In this embodiment, the value of R1 is set as 3, but the value of R1 can be decided by the user or by the system default, as mentioned above. The two images are merged together to form the first high dynamic range image 10. Afterward in Step S42, an image quality evaluation is performed for the first high dynamic range image 10, for example, evaluation for entropy, a sum of picture edges, or a ratio of over-exposure to under-exposure of the image, as explained below. Next in Step S43, it is judged that whether the image evaluation is performed for the first time. In this case the image evaluation is performed for the first time, therefore the flow proceeds to Step S45 of increasing the exposure duration ratio so as to search for the optimal exposure duration ratio.

Figure 4:
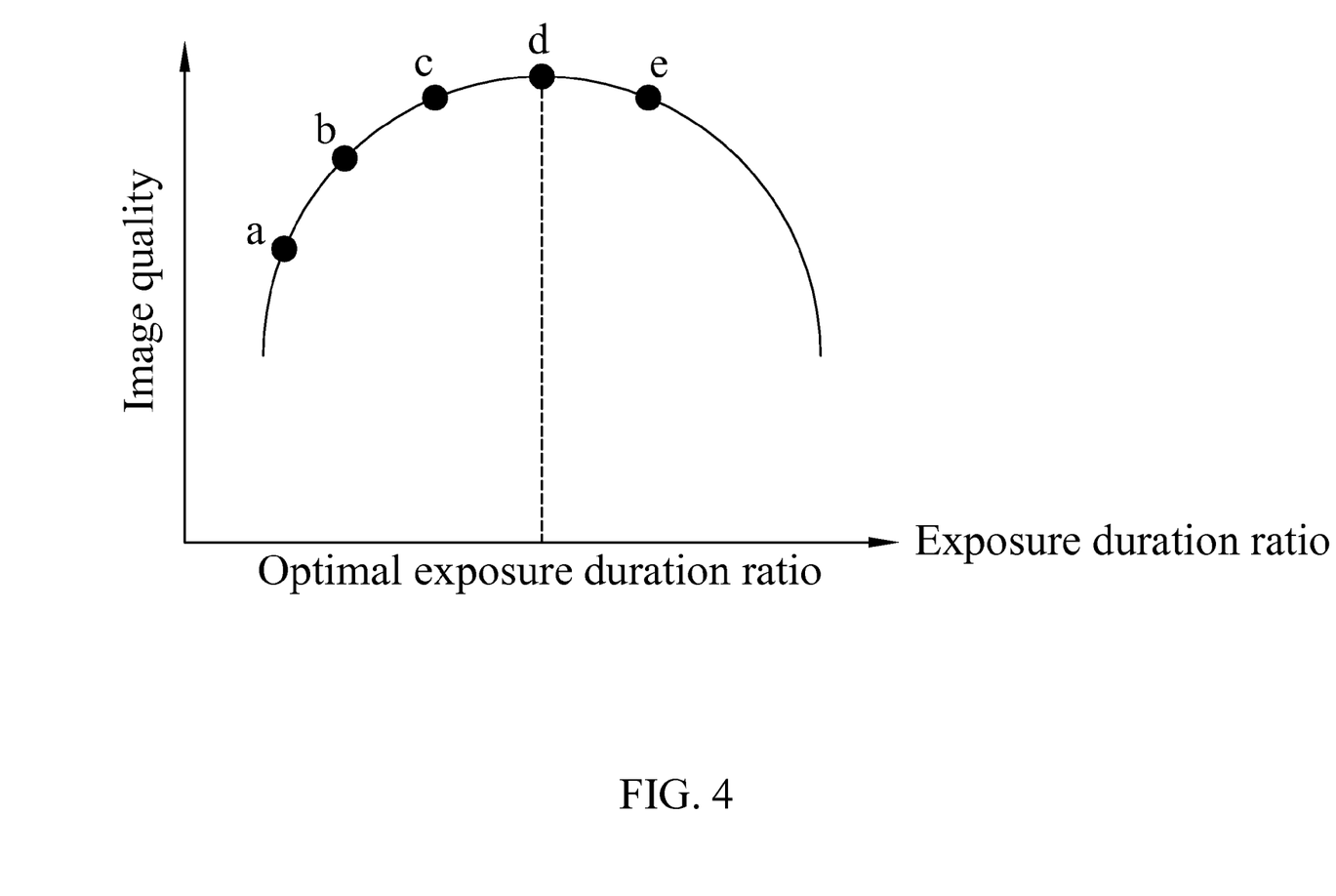
FIG. 4 is a diagram showing the relationship between the exposure time and image quality according to the preferred embodiment of the method for controlling exposure time of high dynamic range images of the present invention.

FIG. 4 is a diagram showing the relationship between the exposure duration ratio and image quality according to the preferred embodiment of the method for controlling exposure time of high dynamic range images of the present invention. FIG. 4 can be utilized to explain the reason of increasing the exposure duration ratio in Step S45. When the exposure duration ratio is increasing from a, b, c to d, the image quality increases accordingly in principle, as shown in FIG. 4. However, when the exposure duration ratio is increased from d to e, the compression process of the color mapping begins to destroy the details and contrast of a picture and cause the image quality unable to increase in accordance to the increasing of the exposure duration ratio. In other words, the purpose of the present invention is to search for the exposure duration ratio d, and the exposure duration ratio d momentarily is the optimal exposure duration ratio defined in the present invention. Reflecting to the practical embodiment, if the image quality of a later high dynamic range image within two consecutive high dynamic range images is comparatively worse than the image quality of the previous high dynamic range image, the exposure duration ratio of the previous high dynamic range image is defined as the optimal exposure duration ratio of the present invention.

Due to that the image evaluation is performed for the first time in Step S43, only one high dynamic range image 10 is available currently and there is no other image to perform the image comparison. Therefore, the exposure duration ratio R2 which is assumed to raise up to 7, is increased directly in Step S45, and the flow returns back to Step S41. In Step S41, the exposure duration ratio R2 with value 7 is utilized by the image sensor to shoot the second long exposure time image 503 and the second short exposure time image 504, and the second long exposure time image 503 and the second short exposure time image 504 are merged to form a second high dynamic range image 20. Afterward, the flow re-enters Step S42 to perform the image quality evaluation, for example, evaluation for entropy, a sum of picture edges, or a ratio of over-exposure to under-exposure of the image, as explained below, for the second high dynamic range image 20.

In a practical embodiment, the image quality evaluation may be performed according to quantity of numerical information. When the distribution of the pixel brightness of a picture is more diverse, i.e., the pixel values are more diverse, the more information is preserved in the picture. Therefore, entropy can be used as a standard for an image quality evaluation. The equation of entropy is as follows:

$$E = -\sum_i p_i \times \log p_i,$$

where $p_i$ represents the occurrence probability of pixels having a pixel value i, and E represents an entropy value.

In a practical embodiment, the image quality evaluation can be performed further based on the features of human eyes. Due to the fact that human eyes are extra sensitive to local contrast, conventional Canny or Sobel methods can be applied to search the edges of a picture, and then the number of edges in a picture is used as a standard for the image quality evaluation. The first step to judge the number of edges in a picture is to transform the picture into a gray level mode to calculate the sum of the edges in the picture. The greater calculated value represents the better image quality.

In a practical embodiment, the image quality evaluation can be performed further based on the over-exposed or under-exposed proportion of a picture. The basic concept of high dynamic range images is to utilize the long exposure time image to capture the information of the dark areas of a scene, and utilize the short exposure time image to capture the information of bright areas of the scene. Therefore, assuming that the number of digits of the image sensor is 8 and thus the pixel values is an integer between 0 and 255, and then if the pixel value of the darkest area of the long exposure time image is close or less than a first preset value, for example, the pixel value is less than 10, then the exposure duration of the present image is not long enough to effectively capture the information of the dark areas. Contrarily, if the pixel value of the brightest area of the short exposure time image is close to or greater than a second preset value, for example, the pixel value is greater than 250, then the exposure duration of the present image is not short enough to effectively capture the information of the bright areas. Based on the present concept, the exposure duration ratio can be increased until the pixel value of the darkest area of the long exposure time image is not too dark and the pixel value of the brightest area of the short exposure time image is not too bright.

Up to now, two image qualities are already generated to correspond to the first high dynamic range image 10 and the second high dynamic range image 20, respectively. Then, the flow proceeds to Step S43. Since the image evaluation is not performed for the first time momentarily, the flow proceeds to Step S44 to judge if the optimal exposure duration ratio is already obtained. Since the optimal exposure duration ratio is not obtained momentarily, the flow proceeds to Step S46 to judge if the image quality of the high dynamic range image 20 is superior to the image quality of the first high dynamic range image 10. As mentioned above, if the second image quality of the high dynamic range image 20 is superior to the image quality of the first high dynamic range image 10, then the flow proceeds to Step S45 to keep increasing the exposure duration ratio (i.e. equivalent to timing a and timing b in FIG. 4) momentarily; if the image quality of the second high dynamic range image 20 is not superior to the image quality of the first high dynamic range image 10, then the flow proceeds to Step S47 (i.e. equivalent to timing d and timing e in FIG. 4) momentarily, to decrease the exposure duration ratio and set the reduced exposure duration ratio as the optimal exposure duration ratio, namely, the optimal exposure duration ratio is determined. In other words, the local maximum value at timing d of FIG. 4 is the optimal exposure duration ratio defined in the present invention.

It is assumed that the judgment result of Step S46 is that the image quality of the second high dynamic range image 20 is superior to the image quality of the first high dynamic range image 10 which represents the optimal exposure duration ratio is not determined yet, then the flow proceeds to Step S45 to keep increasing the exposure duration ratio R3 which is assumed to raise up to 10, and then the flow returns to Step S41. In Step S41, the exposure duration ratio R3 is utilized by the image sensor to shoot the third long exposure time image 505 and the third short exposure time image 506, and the third long exposure time image 505 and the third short exposure time image 506 are merged to form a third high dynamic range image 30, and then the flow re-enters Step S42 to perform the image quality evaluation for the third high dynamic range image 30. Since the image evaluation is not performed for the first time momentarily and the optimal exposure duration ratio is not determined, the flow re-enters Step S46 to judge if the image quality of the third high dynamic range image 30 is superior to the image quality of the second high dynamic range image 20. Assume that the image quality of the third high dynamic range image 30 is not superior to the image quality of the second high dynamic range image 20, then the flow proceeds to Step S47 to decrease the exposure duration ratio, and the reduced exposure duration ratio is set as the optimal exposure duration ratio, i.e., the exposure duration ratio is decreased from R3 with value 10 to R2 with value 7, and R2 is set as the optimal exposure duration ratio. Afterward, the flow returns to Step S41 again.

In Step S41, the exposure duration ratio R2 is utilized by the image sensor to shoot the fourth long exposure time image 507 and the fourth short exposure time image 508, and the fourth long exposure time image 507 and the fourth short exposure time image 508 are merged to form a fourth high dynamic range image 40, and then the flows proceeds to Step S42 to perform the image quality evaluation for the fourth high dynamic range image 40. Since the image evaluation is not performed for the first time momentarily and the exposure duration ratio is already is determined, the flow proceeds to Step S48 to judge if the image quality evaluation is performed for the first time after the optimal exposure duration ratio is found. If the image quality evaluation is performed for the first time after the optimal exposure duration ratio is found, then the flow proceeds to Step S50 to maintain the exposure duration ratio R2. Afterward, the flow returns to Step S41 again to utilize the exposure duration ratio R2 to shoot a fifth long exposure time image 509 and a fifth short exposure time image 510, and the fifth long exposure time image 509 and the fifth short exposure time image 510 are merged to form a fifth high dynamic range image 50.

The reason for executing Step S48 is that images are been shooting consecutively. Although the optimal exposure duration ratio is already found in Step S44, the main body or the object under shooting may move or shift during the duration from executing Step S44 till executing Step S48, or the main body or the object under shooting may move from indoor to outdoor, to cause the optimal exposure duration ratio founded by Step S44 is no longer suitable to apply to shoot images now and in the future. Therefore, the optimal exposure duration ratio must be re-determined again. In order to judge whether the main body or the object moves or shifts, two high dynamic range images are required. Since there is only one single high dynamic range image momentarily (namely, the fourth high dynamic range image 40), another high dynamic range image is generated under the current exposure duration ratio R2 to perform the comparison, so as to judge if the optimal exposure duration ratio determined by Step S44 is suitable to apply to the current (the time of Step S48) image under shooting. In other words, the steps after Step S48 can be omitted if the scene under shooting is static.

When the flow returns to Step S41 again, the exposure duration ratio R2 (the value of R2 is 7) is utilized by the image sensor to shoot the fifth long exposure time image 509 and the fifth short exposure time image 510, and the fifth long exposure time image 509 and the fifth short exposure time image 510 are merged to form the fifth high dynamic range image 50. Afterward, the flow proceeds to Step S42 to perform the image quality evaluation for the fifth high dynamic range image 50. Since the image evaluation is not performed for the first time momentarily, the optimal exposure duration ratio is already found, and the image quality evaluation is not performed for the first time after the optimal exposure duration ratio is found, the flow proceeds to Step S49 to judge if the image quality of the fifth high dynamic range image 50 is equal to the image quality of the fourth high dynamic range image 40. If the image quality of the fifth high dynamic range image 50 is equal to the image quality of the fourth high dynamic range image 40, the optimal exposure duration ratio found by Step S44 is still suitable to apply to the current image under shooting, therefore the flow proceeds to Step S50 to use the current exposure duration ratio R2 to perform shooting. If the image quality of the fifth high dynamic range image 50 is not equal to the image quality of the fourth high dynamic range image 40, the optimal exposure duration ratio found by Step S44 is not suitable to apply to the current image under shooting, therefore the flow proceeds to Step S51 to reset the exposure duration ratio from R2 (having the value 7) to the initial exposure duration ratio R1 (having the value 3). Therefore, the optimal exposure duration ratio is not found yet, and the follow returns to Step S41, and then proceeds to Step S46 via Step S44 to resume the aforementioned procedures of determining the optimal exposure duration ratio.

In a practical embodiment, Step S49 is used to judge if the image qualities are the same, and a preset range can be implemented such that the image qualities within this range will be regarded as the same. For example, two image qualities can be regarded as the same if the difference between the two image qualities is within the range of ±5% or ±10%.

In a practical embodiment, the exposure duration ratio R of the present invention may be an integer having a value between 1 and 64. Preferably, the exposure duration ratio R of the present invention is an integer having a value between 3 and 16.

In summation of the above, an image sensor is utilized in the method for controlling exposure time of high dynamic range images of the present invention to consecutively generate a plurality of high dynamic range images in the image generation process and perform image quality evaluations for the high dynamic range images. The search for the optimal exposure duration ratio begins with the lowest exposure duration ratio, the exposure duration ratio is step by step increased till the image quality begins to deteriorate, and then the previous exposure duration ratio may be decided as the optimal exposure duration ratio. When the optimal exposure duration ratio is obtained, the image quality evaluation method is applied to verify if the image quality of the present image is the same as the image quality of the previous image. If both image qualities are the same, the optimal exposure ratio will be preserved; if the image quality deteriorates due to variation of the light source, the original lowest exposure duration ratio will be set as the exposure duration ratio and the search for the optimal exposure duration ratio is repeated.

In summary, it is clear that the present invention has broken through the technical limitation of the prior arts and achieved the desired improvements. Moreover, the present invention is not easy to be conceived by those who skilled in this technical area. Apparently, the novelty and practicability of the present invention have met the application requirements of a patent.

The aforementioned embodiments are to explain the technical ideas and features of the present invention. The purpose is to enable those who skilled in this technical area to understand the content of the present invention and realize it. It will be understood that the present invention is not limited to the details thereof. Various equivalent variations and modifications may still occur to those skilled in this art in view of the teachings of the present invention. Thus, all such variations and equivalent modifications are also embraced within the scope of the present invention as defined in the appended claims.

What is claimed is:

1. A method for controlling exposure time of high dynamic range images, comprising steps of:
    using an image sensor to respectively shoot a first long exposure time image and a first short exposure time image for being merged to generate a first high dynamic range image having a first exposure duration ratio, wherein the first exposure duration ratio is a ratio of an exposure duration of the first long exposure time image to an exposure duration of the first short exposure time image;
    using the image sensor to respectively shoot a second long exposure time image and a second short exposure time image for being merged to generate a second high dynamic range image having a second exposure duration ratio after shooting the first long exposure time image and the first short exposure time image, wherein the second exposure duration ratio is a ratio of an exposure duration of the second long exposure time image to an exposure duration of the second short exposure time image, wherein the second exposure duration ratio is greater than the first exposure duration ratio;
    performing an image quality evaluation for the first high dynamic range image to obtain a first image quality, and performing an image quality evaluation for the second high dynamic range image to obtain a second image quality; and
    comparing the second image quality with the first image quality;
    if the second image quality is superior to the first image quality, using a third exposure duration ratio to shoot a third high dynamic range image, wherein the third exposure duration ratio is greater than the second exposure duration ratio;
    if the second image quality is not superior to the first image quality, using the first exposure duration ratio of the first high dynamic range image to shoot the third high dynamic range image and setting the first exposure duration ratio as an optimal exposure duration ratio.

2. The method of claim 1, wherein each exposure duration ratio corresponds to an exposure duration, and an average of the exposure durations of the long exposure time image and the short exposure time image is equal to the exposure duration.

3. The method of claim 2, wherein the evaluation process of the image quality comprises a formula to calculate entropy, the equation is $$E = -\sum_i p_i \times \log p_i,$$

$p_i$ represents the occurrence probability of pixels having a pixel value i, E represents an entropy value, and the greater the entropy value represents the better quality of the corresponding image.

4. The method of claim 2, wherein the evaluation process of the image quality comprises a step of calculating a sum of edges, and the greater sum of edges represents the better quality of the corresponding image.

5. The method of claim 2, wherein the evaluation process of the image quality further comprises a step of computing the ratio of over-exposure to under-exposure.

6. The method of claim 2, further comprising following steps of:

using the optimal exposure duration ratio to shoot a fourth high dynamic range image and a fifth high dynamic range image;

performing the image quality evaluation for the fourth high dynamic range image to obtain a fourth image quality;

performing the image quality evaluation for the fifth high dynamic range image to obtain a fifth image quality;

judging whether the fifth image quality is the same as the fourth image quality;

maintaining the optimal exposure duration ratio to sustainably shoot high dynamic range images if the fifth image quality is equal to the fourth image quality; and clearing the optimal exposure duration ratio and using an initial exposure duration ratio to restart searching for the optimal exposure duration ratio if the fifth image quality is not equal to the fourth image quality.

7. The method of claim 6, wherein the fifth image quality and the fourth image quality are defined to be equal if a difference between the fifth image quality and the fourth image quality is within the range of ±5% or ±10%.

8. The method of claim 7, wherein the exposure duration ratio is an integer within the range of 1 to 64.

* * * * *